(12) United States Patent
Hwang et al.

(10) Patent No.: US 12,548,388 B2
(45) Date of Patent: Feb. 10, 2026

(54) SYSTEM AND METHOD FOR PROVIDING PASSENGER EXIT ASSISTANCE

(71) Applicant: GM Global Technology Operations LLC, Detroit, MI (US)

(72) Inventors: Jongho Hwang, Busan (KR); Suyoung Ha, Seoul (KR); Youngsoo Im, Incheon (KR); Chihyun Cho, Incheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 66 days.

(21) Appl. No.: 18/440,824

(22) Filed: Feb. 13, 2024

(65) Prior Publication Data

US 2025/0259488 A1 Aug. 14, 2025

(51) Int. Cl.
*G07C 5/08* (2006.01)

(52) U.S. Cl.
CPC .................. *G07C 5/0825* (2013.01)

(58) Field of Classification Search
CPC .. G07C 5/0825; B60K 35/10; B60K 2360/21; B60K 35/81; B60K 2360/178; B60K 35/28; B60K 35/29; B60K 35/60; B60K 35/22
See application file for complete search history.

(56) References Cited

U.S. PATENT DOCUMENTS

2023/0031709 A1* 2/2023 Yu ..................... B60W 60/0016
2024/0116439 A1* 4/2024 Kostuch ................. G06V 20/58

FOREIGN PATENT DOCUMENTS

JP 2013180634 A 9/2013

\* cited by examiner

*Primary Examiner* — Sisay Yacob
(74) *Attorney, Agent, or Firm* — Honigman LLP; Matthew H. Szalach; Jonathan P. O'Brien

(57) ABSTRACT

A computer-implemented method that, when executed by data processing hardware, cause the data processing hardware to perform operations is provided. The operations include obtaining a rear passenger status, obtaining a seat belt status, obtaining a door lock status, determining whether exit assistance conditions are met based on the rear passenger status, the seat belt status, and the door lock status, and displaying an exit assistance on one or more displays.

20 Claims, 6 Drawing Sheets

SYSTEM AND METHOD FOR PROVIDING PASSENGER EXIT ASSISTANCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for displaying passenger exit assistance and, more particularly, to a system and method for displaying passenger exit assistance for rear passengers of a vehicle.

In general, vehicles may be equipped with driver assistance systems for identifying nearby vehicles or pedestrians and notifying the driver of the same. Some driver assistance systems may notify drivers of nearby vehicles or pedestrians while the vehicle is in motion and while the vehicle is at rest (i.e., in a park mode), for example. It may be desirable to identify nearby vehicles or pedestrians and notify other passengers of the vehicle as well. Shortcomings of existing systems will be addressed by aspects of the present disclosure.

SUMMARY

In one configuration, a computer-implemented method that, when executed by data processing hardware, cause the data processing hardware to perform operations is provided. The operations include obtaining a rear passenger status, obtaining a seat belt status, obtaining a door lock status, determining whether exit assistance conditions are met based on the rear passenger status, the seat belt status, and the door lock status, and displaying exit assistance on one or more displays of a vehicle.

The method may include one or more of the following optional features. For example, the exit assistance conditions may include a first exit assistance condition that is met and the exit assistance may be displayed on a left rear display of the one or more displays when a passenger is detected in a left rear seat of the vehicle, a left rear seat belt is unfastened, and a left rear passenger compartment door is unlocked. The exit assistance conditions may include a second exit assistance condition that may be met and the exit assistance may be displayed on a right rear display of the one or more displays when a passenger is detected in a right rear seat of the vehicle, a right rear seat belt is unfastened, and a right rear passenger compartment door is unlocked. The exit assistance may be displayed on the left rear display as long as the first conditions are met and may be displayed on the right rear display as long as the second conditions are met. The exit assistance of the left rear display may include a driver side view from the vehicle when the first exit assistance conditions are met and the exit assistance of the right rear display may include a co-pilot side view from the vehicle when the second exit assistance conditions are met. The exit assistance may be displayed on the one or more displays while the exit conditions are met. The exit assistance may be displayed for a first duration after the exit assistance conditions are no longer met.

In one configuration, a system including data processing hardware and memory hardware in communication with the data processing hardware is provided, the memory hardware storing instructions that, when executed on the data processing hardware, cause the data processing hardware to perform operations. The operations include obtaining a rear passenger status, obtaining a seat belt status, obtaining a door lock status, determining whether exit assistance conditions are met based on the rear passenger status, the seat belt status, and the door lock status, and displaying exit assistance on one or more displays of a vehicle.

The system may include one or more of the following optional features. For example, the exit assistance conditions may include a first exit assistance condition that is met and the exit assistance may be displayed on a left rear display of the one or more displays when a passenger is detected in a left rear seat of the vehicle, a left rear seat belt is unfastened, and a left rear passenger compartment door is unlocked. The exit assistance condition that may be met and the exit assistance may be displayed on a right rear display of the one or more displays when a passenger is detected in a right rear seat of the vehicle, a right rear seat belt is unfastened, and a right rear passenger compartment door is unlocked. The exit assistance may be displayed on the left rear display as long as the first conditions are met and may be displayed on the right rear display as long as the second conditions are met. The exit assistance of the left rear display may include a driver side view from the vehicle when the first exit assistance conditions are met and the exit assistance of the right rear display may include a co-pilot side view from the vehicle when the second exit assistance conditions are met. The exit assistance may be displayed on the one or more displays while the exit conditions are met. The exit assistance may be displayed for a first duration after the exit assistance conditions are no longer met.

In another configuration, a vehicle management system including a body control module, a video control unit in communication with the body control module, data processing hardware, and memory hardware in communication with the data processing hardware is provided, the memory hardware storing instructions that, when executed on the data processing hardware, cause the data processing hardware to perform operations. The operations include obtaining a rear passenger status using weight sensors in one or more rear seats, obtaining a seat belt status using seat belt sensors in one or more rear seats, obtaining a door lock status at the body control module, determining whether exit assistance conditions are met based on the rear passenger status, the seat belt status, and the door lock status, and displaying an exit assistance on one or more rear displays of a vehicle.

The vehicle management system may include one or more of the following optional features. The exit assistance conditions may include a first exit assistance condition that may be met and the exit assistance may be displayed on a left rear display of the one or more displays when a passenger is detected in a left rear seat of the vehicle, a left rear seat belt is unfastened, and a left rear passenger compartment door is unlocked. The exit assistance conditions may include a second exit assistance condition that may be met and the exit assistance may be displayed on a right rear display of the one or more displays when a passenger is detected in a right rear seat of the vehicle, a right rear seat belt is unfastened, and a right rear passenger compartment door is unlocked. The exit assistance may be displayed on the left rear display as long as the first conditions are met and may be displayed on the right rear display as long as the second conditions are met. The exit assistance of the left rear display may include a driver side view from the vehicle when the first exit assistance conditions are met and the exit assistance of the right rear display may include a co-pilot side view from the vehicle when the second exit assistance conditions are met. The exit assistance may be displayed on a rear left display for a first duration after first exit conditions are no longer met and the exit assistance may be displayed on a rear right display for the first duration after second exit conditions are no longer met.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
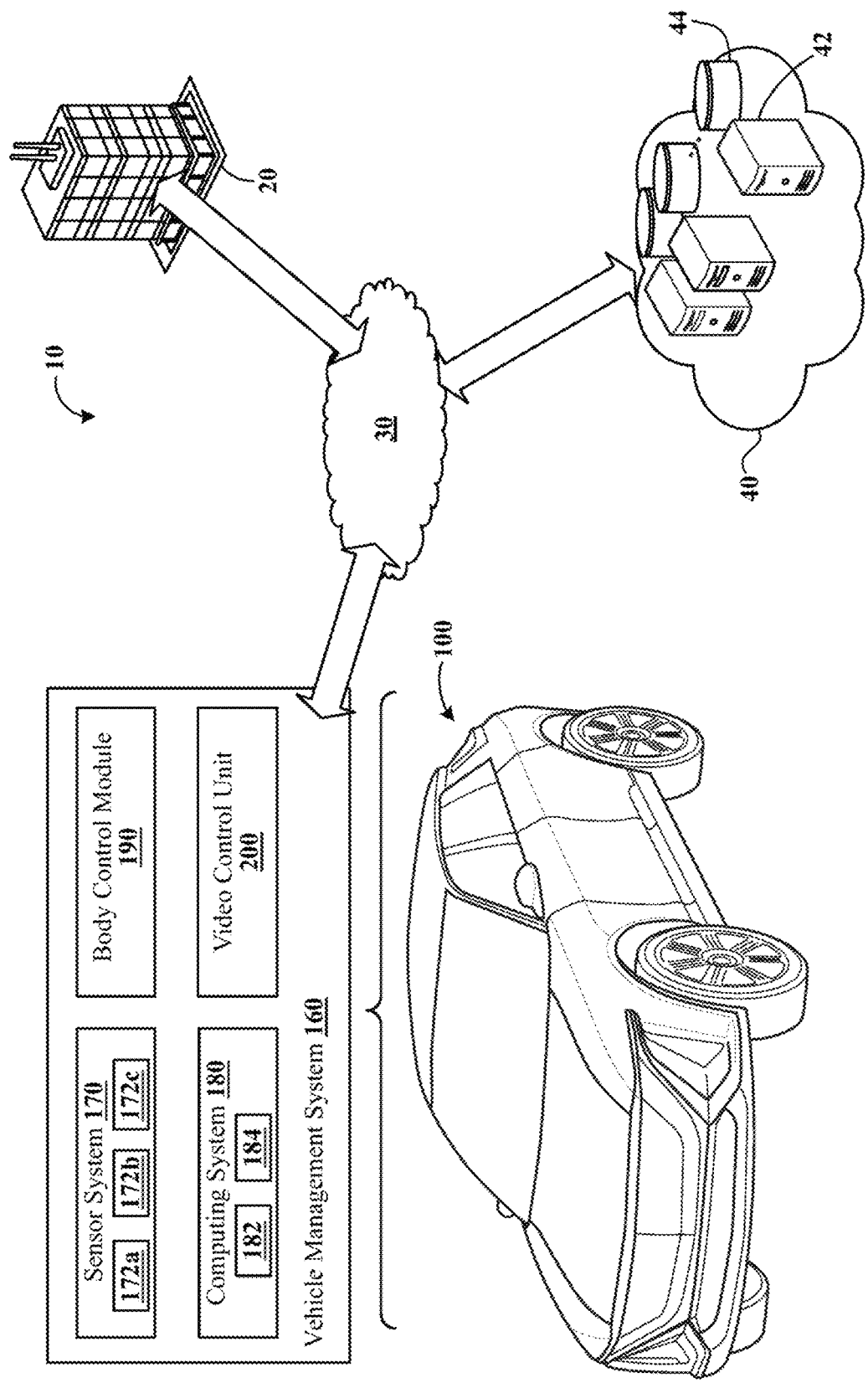
FIG. 1 is a schematic diagram of a vehicle environment including a vehicle management system according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example vehicle operating environment 10 is provided for illustration of the principles of the present disclosure. The vehicle operating environment 10 includes a vehicle 100 and a vehicle service center 20. For the sake of illustration, the vehicle operating environment 10 is shown as including a single vehicle service center 20. However, in other examples, the vehicle operating environment 10 may include a plurality of vehicle service centers 20 in communication over a network 30 (e.g., the Internet, cellular networks).

Figure 2:
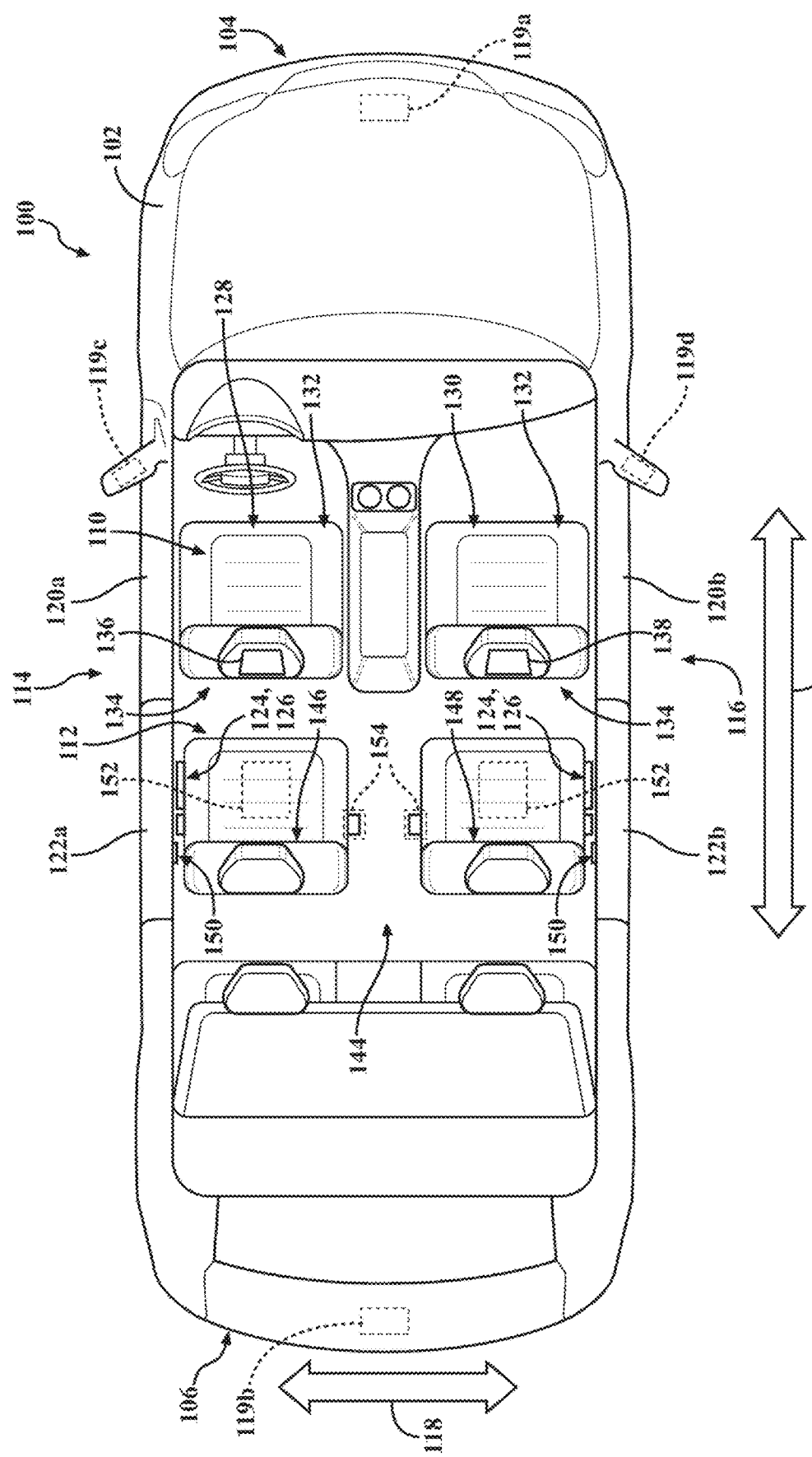
FIG. 2 is top schematic view of the vehicle of FIG. 1.

With reference to FIG. 2, the vehicle 100 can have a vehicle body 102, which has a first or front end 104 spaced fore-aft from a second or rear end 106 with respect to a longitudinal axis 108. The vehicle 100 has a first or front passenger compartment 110 near the front end 104 and a second or rear passenger compartment 112 spaced fore-aft of the front passenger compartment 110 toward the rear end 106. In this example, the front passenger compartment 110 and the rear passenger compartment 112 each has a first or driver side 114 and a second or co-pilot side 116 spaced cross-car from the driver side 114 with respect to a lateral axis 118. The lateral axis 118 is perpendicular to the longitudinal axis 108, as shown in FIG. 2. The driver and co-pilot sides 114, 116 may be located on different sides of the vehicle 100 (i.e., left or right) depending on the particular region of the world where the vehicle 100 is intended for use. For the purposes of the present disclosure, the driver side 114 is on the left side of the vehicle 100 and the co-pilot side 116 is on the right side of the vehicle 100 with respect to the lateral axis 118. Note, the present disclosure equally applies to vehicles where the driver side is on the right side of the vehicle and the co-pilot side is on the left side of the vehicle.

The vehicle 100 may include one or more cameras 119 arranged on the vehicle body 102. For instance, a first or front camera 119a may be arranged on the front end 104 (e.g., on a grille of the vehicle), a second or rear camera 119b may be arranged on the rear end 106 (e.g., on a tailgate of the vehicle), a third or left camera 119c may be arranged on the driver side 114 (e.g., on a driver side mirror), and a fourth or right camera 119d may be arranged on the co-pilot side 116 (e.g., on a co-pilot side mirror). The one or more cameras 119, 119a-119d may be configured to provide a 360 degree view surrounding the vehicle 100 (e.g., a "bird's eye" view) or another view that may be desirable for one or more passengers of the vehicle 100 when operating the vehicle 100 or exiting the vehicle 100, for example.

With continued reference to FIG. 2, one or more closures (e.g., doors, tailgate, etc.) may be coupled to the vehicle body 102 of the vehicle 100. For instance, a front left passenger compartment door 120a and a front right passenger compartment door 120b may be coupled to the vehicle body 102 to enclose the front passenger compartment 110. Likewise, a rear left passenger compartment door 122a and a rear right passenger compartment door 122b may be coupled to the vehicle body 102 to enclose the rear passenger compartment 112. The front passenger compartment doors 120a, 120b and the rear passenger compartment doors 122a, 122b may each have a door handle 124 and/or lock/un-lock buttons 126 to facilitate passenger entry and exit of the vehicle 100.

The front passenger compartment 110 may have a first or front left seat 128 and a second or front right seat 130. The front left seat 128 and the front right seat 130 each has a front side 132 pointing in the direction of the front end 104 and a rear side 134 pointing in the direction of the rear end 106. The front left seat 128 may include a first or left rear display 136 coupled to the rear side 134 and the front right seat 130 may include a second or right rear display 138 coupled to the rear side 134. The left and right rear displays 136, 138 may be arranged so that one or more rear passengers can view and interact with the rear displays 136, 138. The left and right rear displays 136, 138 may each include an on/off button 140 and/or an array of LEDs 142.

Figure 3:
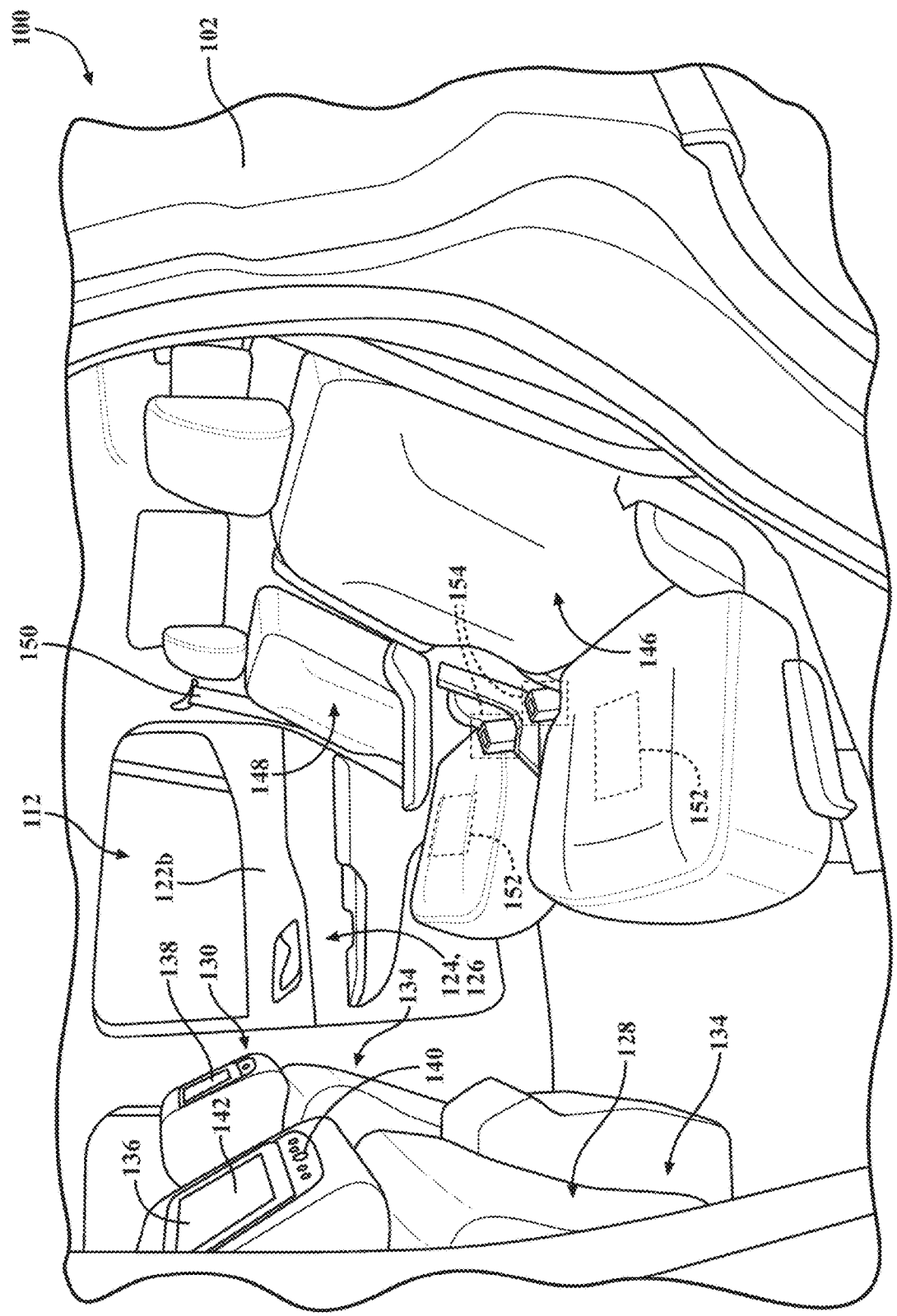
FIG. 3 is a perspective view of a rear passenger compartment the vehicle of FIG. 1.

With reference to FIGS. 2 and 3, the rear passenger compartment 112 may have one or more rear seats 144 spaced fore-aft from the front left and front right seats 128, 130. For example, while not readily shown in the figures, the one or more rear seats 144 may be a bench seat extending cross-car with respect to the lateral axis 118 and configured to accommodate up to three rear passengers. Alternatively, as shown in FIGS. 2 and 3, the one or more rear seats 144 may be separate rear passenger seats (e.g., captain's chairs) that are spaced cross-car from one another with respect to the lateral axis 118 so that the seats generally align with the front left seat 128 and the front right 130 seat, respectively. In other words, a third or rear left seat 146 may be arranged fore-aft of the front left seat 128 and a fourth or rear right seat 148 may be arranged fore-aft of the front right seat 130. The one or more rear seats 144, such as the rear left seat 146 and the rear right seat 148, each has a seat belt 150 that may be engaged (i.e., fastened) and disengaged (i.e., unfastened) by a passenger. As will be discussed in more detail below, the rear seats 144 may each include a weight sensor 152 and a seat belt sensor 154. The weight sensor 152 may be desirable for determining whether a passenger is sitting in the rear left seat 146 adjacent the rear left passenger compartment door 122a or the rear right seat 148 adjacent the rear right passenger compartment door 122b, for example. The seat belt sensor 154 may be desirable for determining whether the seat belt 150 of the rear left seat 146 or the rear right seat 148 is fastened or unfastened.

Figure 4:
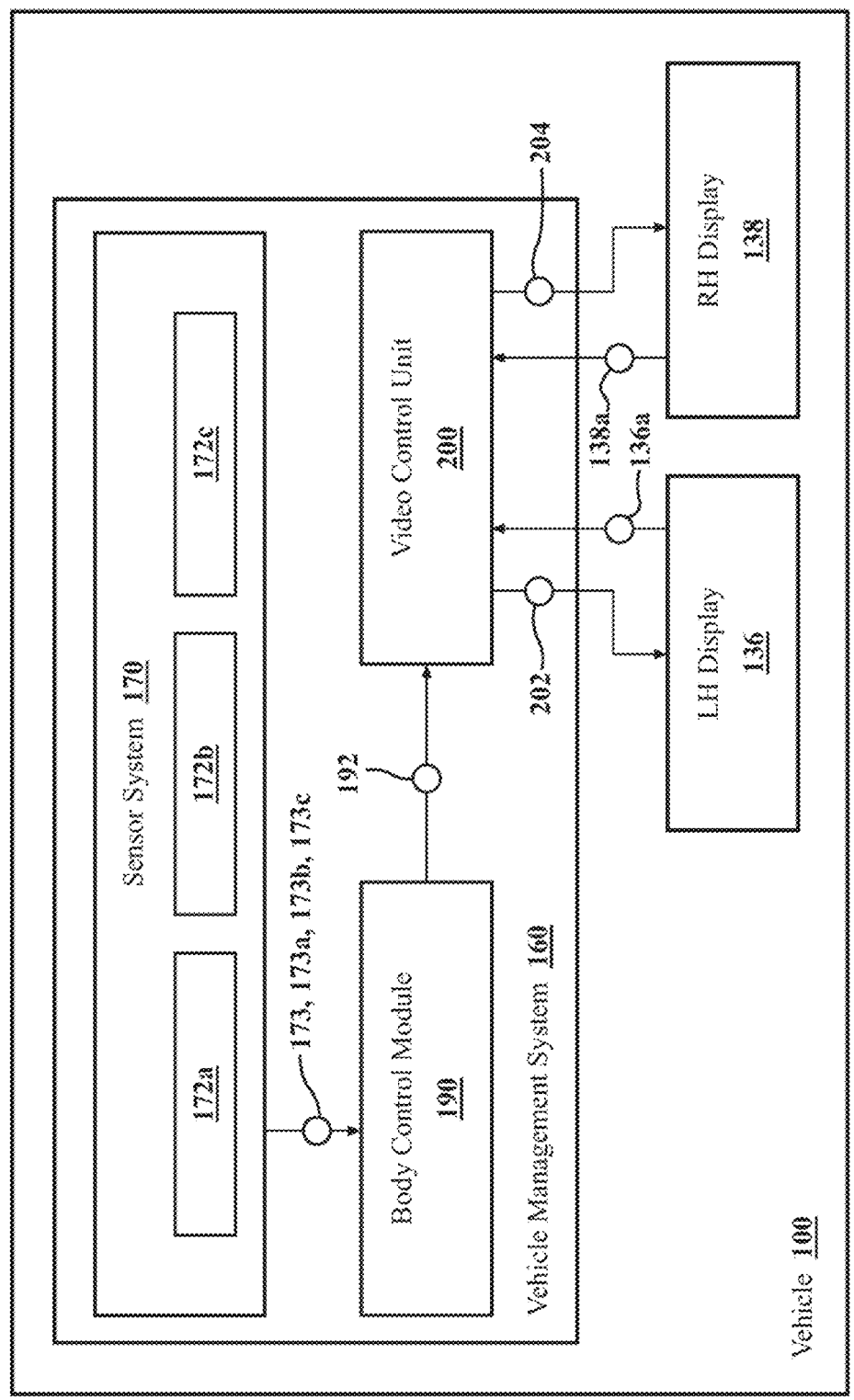
FIG. 4 is an enlarged schematic diagram showing an example of the vehicle management system of FIG. 1 according to the principles of the present disclosure.

With reference to FIGS. 1 and 4, the vehicle 100 includes a vehicle management system 160 comprising a sensor system 170, a computing system 180, a vehicle system module such as a body control module 190, and a video control unit 200. While the vehicle 100 maneuvers about the environment 10 or is at rest within the environment 10, the sensor system 170 includes various sensor subsystems 172, 172a, 172b, 172c configured to gather sensor data relating to characteristics of the environment 10 and/or a status of the vehicle 100. For instance, the sensor subsystem 172 may include a vehicle exterior sensor subsystem 172a configured to measure or obtain external environmental data 173a, such surrounding objects (e.g., vehicles, bikes, pedestrians, etc.), an interior sensor subsystem 172b configured to measure or obtain interior environmental data 173b, such as vehicle occupancy, and/or a vehicle status sensor subsystem 172c configured to measure or obtain vehicle operating data 173c, such as vehicle location and operating parameters.

As the sensor system 170 gathers the sensor data 173, a computing system 180 is configured to store, process, and/or communicate the sensor data 173 within the vehicle operating environment 10. In order to perform computing tasks related to the sensor data 173, the computing system 180 of the vehicle 100 includes data processing hardware 182 and memory hardware 184. The data processing hardware 182 is configured to execute instructions stored in the memory hardware 184 to perform computing tasks related to operation and management of the vehicle 100. Generally speaking, the computing system 180 refers to one or more locations of data processing hardware and/or memory hardware.

In some examples, the computing system 180 is a local system located on the vehicle 100 (e.g., vehicle control unit). When located on the vehicle 100, the computing system 180 may be centralized (i.e., in a single location/area on the vehicle 100, for example, a vehicle control unit), decentralized (i.e., located at various locations about the vehicle 100), or a hybrid combination of both (e.g., with a majority of centralized hardware and a minority of decentralized hardware). To illustrate some differences, a decentralized computing system 180 may allow processing to occur at an activity location while a centralized computing system may allow for a central processing hub that communicates to systems located at various positions on the vehicle 100.

Additionally or alternatively, the computing system 180 includes computing resources that are located remotely from the vehicle 100. For instance, the computing system 180 may communicate via the network 30 with a remote vehicle computing system 80 (e.g., a remote computer/server or a cloud-based environment). Much like the computing system 180, the remote vehicle computing system 80 includes remote computing resources such as remote data processing hardware 82 and remote memory hardware 84. Here, the sensor data 173 or other processed data (e.g., data processed locally by the computing system 180) may be stored in the remote vehicle computing system 80 and may be accessible to the computing system 180. In some examples, the computing system 180 is configured to utilize the remote resources 82, 84 as extensions of the computing resources 182, 184 such that resources of the computing system 180 may reside on resources of the remote vehicle computing system 80.

The body control module 190 is capable of monitoring and controlling various electronic aspects of the vehicle 100 (e.g., the sensor system 170, lock/un-lock button 126, etc.). In other words, the body control module 190 is capable of receiving sensor data 173 from the sensor system 170 and providing one or more inputs 192 to one or more output devices, such as the video control unit 200, for example. As will be discussed in more detail below, the sensor data 173 may be received by the body control module 190 as one or more exit assistance inputs 307, and the inputs 307 may be used for determining whether it is appropriate to display exit assistance 202, 204 on one or both of the rear displays 136, 138.

The video control unit 200 is capable of controlling various electronic aspects of the vehicle (e.g., infotainment, displaying a front camera view or back-up camera view on a display, etc.). In other words, the video control unit 200 can receive one or more inputs and display one or more outputs on one or more displays of the vehicle 100. For example, the video control unit 200 can receive the input 192 from the body control module 190 and simultaneously, or immediately thereafter, display relevant sensor data (i.e., exit assistance 202, 204), such as exterior sensor data 173b received by or more cameras, through a first or left exit assistance 202 for the left rear display 136 and/or a second or right exit assistance 204 for the right display 138. The relevant sensor data 173 for the left exit assistance 202 may include a view that shows vehicles, pedestrians, or animals, for example, located on or near the driver side 114 of the vehicle 100. Likewise, the relevant sensor data 173 for the right exit assistance 204 may include a view that shows vehicles, pedestrians, or animals, for example, located on or near the co-pilot side 116 of the vehicle 100.

With reference again to FIG. 3, the video control unit 200 can receive one or more inputs 136a, 138a from the left rear display 136 or right rear display 138, respectively, and simultaneously, or immediately thereafter, display relevant sensor data (e.g., the exit assistance 202, 204), such as exterior sensor data 173a received by or more cameras. Thus, a passenger can access the exit assistance 202, 204 on command by engaging with (e.g., pressing) the on/off button 140 of one or both of the left rear display 136 and the right rear display 138, for example.

Figure 5:
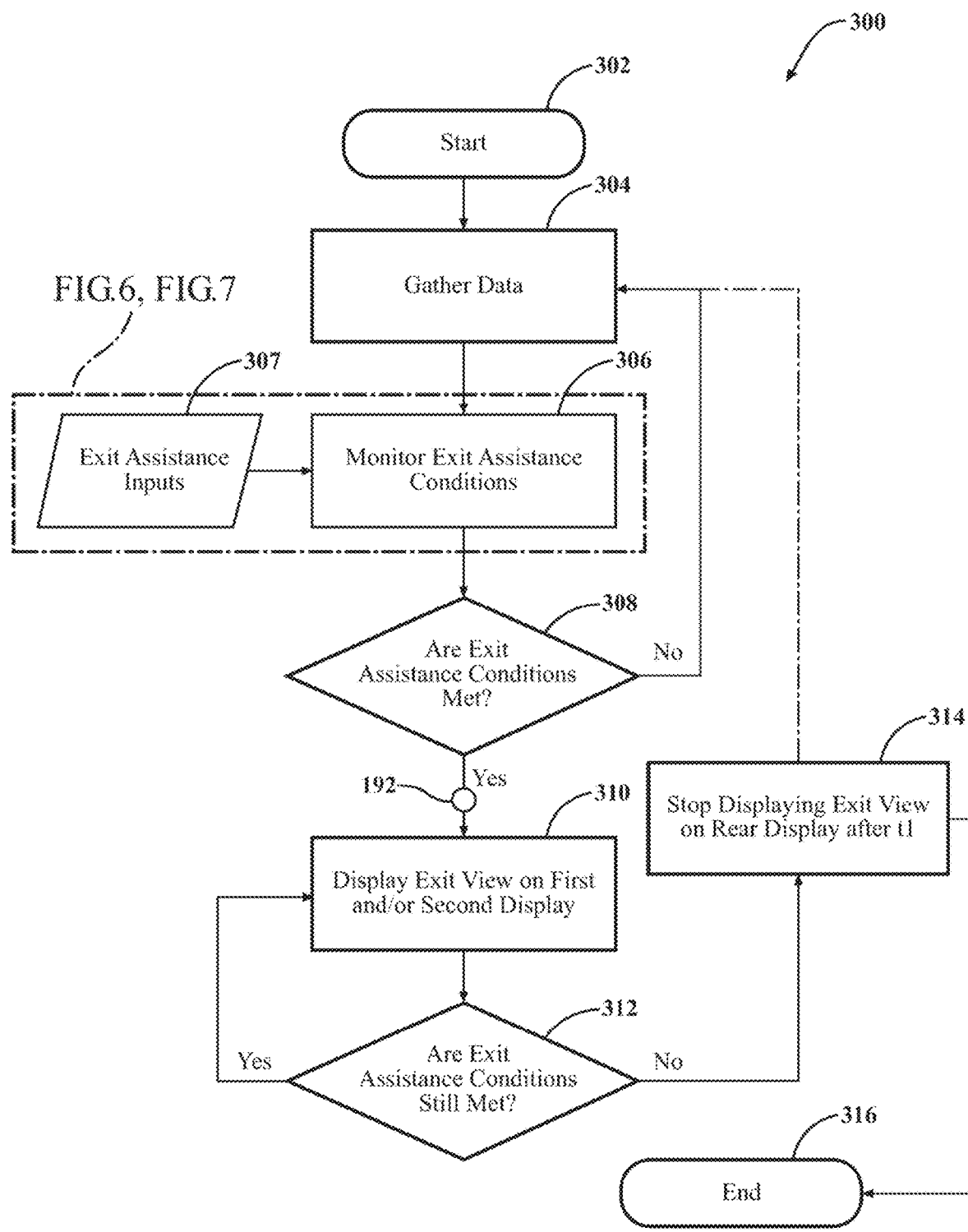
FIG. 5 is a flow diagram showing operations of the vehicle management system of FIG. 4.
Figure 6:
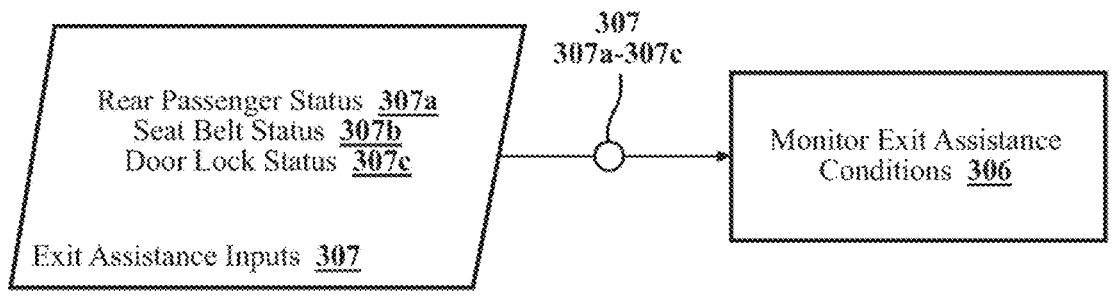
FIG. 6 is a detailed view of the flow diagram of FIG. 5, showing exit assistance inputs.
Figure 7:
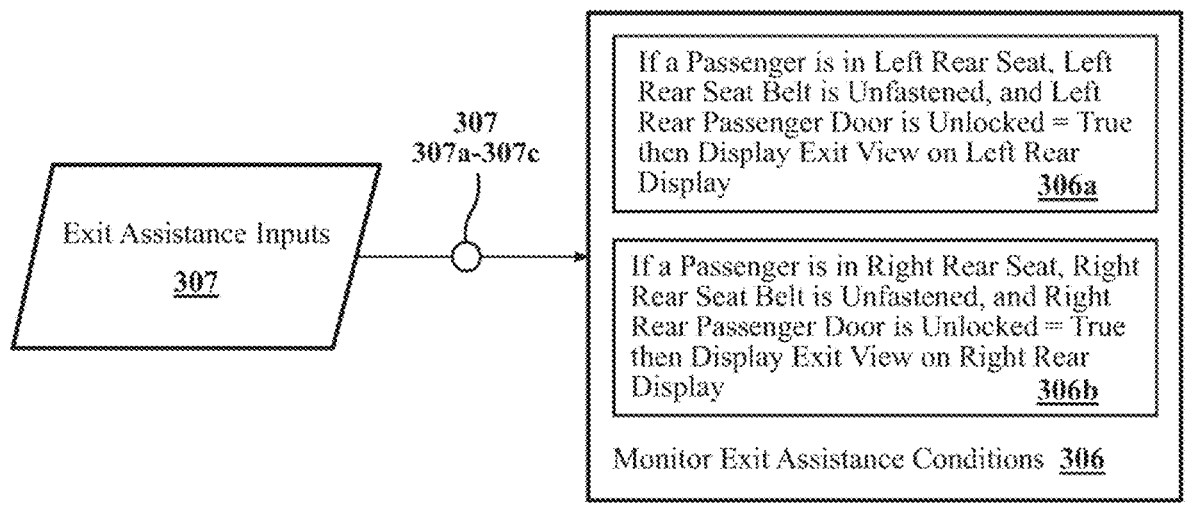
FIG. 7 is a detailed view of the flow diagram of FIG. 5, showing exit assistance conditions.

Referring now to FIG. 5, a method 300 for providing passenger exit assistance is provided. At a first step 302, the method 300 is initiated. In practical terms, the method 300 may be initiated upon powering up of the vehicle 100 by the vehicle operator.

At step 304, the sensor system 170 begins collecting sensor data 173, 173a-173c from one or more of the interior sensor subsystem 172b, the exterior sensor subsystem 172b, and/or the vehicle status sensor subsystem 172c. As introduced above, the sensor data 173 may be utilized at least by the body control module 190 to determine whether one or more exit conditions are met.

At step 306, first and second exit assistance conditions 306a, 306b are monitored by the body control module 190 for determining whether it would be desirable for the left exit assistance 202 or the right exit assistance 204 to be displayed as an exit assistance on the left and/or right rear displays 136, 138. For instance, displaying the left exit assistance 202 as exit assistance on the left rear display 136 may be desirable if a passenger is detected in the rear left seat 146, the seat belt of the rear left seat 146 is unfastened, and the left rear passenger compartment door 122a is unlocked. Likewise, displaying the right exit assistance 204 as exit assistance on the right rear display 138 may be desirable if a passenger is detected in the rear right seat 148, the seat belt 150 of the rear right seat 148 is unfastened, and the right rear passenger compartment door 122b is unlocked.

At step 307, one or more exit assistance inputs 307 based on the sensor data 173 may be provided to the body control module 190 for monitoring the one or more exit assistance conditions 306. For example, a first or rear passenger status 307a, a second or seat belt status 307b, and a third or door lock status 307c may be provided to the body control module 190. The rear passenger status 307a may indicate whether a passenger is detected in the rear left seat 146 or the rear right seat 148. The rear passenger status 307a may be determined based on the interior sensor data 173b from the interior sensor subsystem 172b and, more specifically, based on data received from the weight sensors 152 arranged in the rear left seat 146 and the rear right seat 148, for example. The seat belt status 307b may indicate whether the seat belts 150 of the rear left seat 146 and/or the rear right seat 148 are fastened or unfastened. The seat belt status 307b mat be determined based on the interior sensor data 173b from the interior sensor subsystem 172b and, more specifically, based on data received from the seat belt sensor 154 coupled to or adjacent the rear left seat 146 and the rear right seat 148, for example. The door lock status 307c is monitored by the body control module 190. The door lock status 307c may change as a result of the rear left passenger compartment door 122a and/or the rear right passenger compartment door 122b being unlocked. For example, the door lock status 307c may change if the unlock button of lock/un-lock button 126 coupled to the rear left passenger compartment door 122a or rear right passenger compartment door 122b is engaged by a passenger. Also, the door lock status 307c for the rear left passenger compartment door 122a or the rear right passenger compartment door 122b can change if a passenger engages with the door handle 124 by actuating the door handle 124 (i.e., pulling on the handle 124 in a manner that would ordinarily open the door if the door was unlocked) and causing the door 122a, 122b to unlock. Additionally, if an operator of the vehicle 100 places the vehicle in a "park" mode (e.g., shifts a transmission into park) and the doors 122a, 122b unlock as a result, then the door lock status 307c can change.

At step 308, the body control module 190 determines whether the exit conditions are met. If the exit assistance conditions are met, then the input 192 is provided to the video control unit 200 and the method continues to step 310. If the exit assistance conditions are not met, then the input 192 is not provided to the video control unit 200 and the method 300 returns to step 304 where data 173 continues to be gathered.

At step 310, the video control unit 200 receives the input 192 and displays the left exit assistance 202 to the left rear display 136 and/or displays the right exit assistance 204 to the right rear display 138 accordingly. For instance, if a passenger is only detected in the rear left seat 146, the seat belt 150 of the rear left seat 146 is unfastened, and the rear left passenger compartment door 122a is unlocked, then only the left exit assistance 202 may be displayed on the left rear display 136.

At step 312, if the body control module 190 is still providing an input 192 to the video control unit 200 that the exit conditions are met, then the left exit assistance 202 and/or right exit assistance 204 remains displayed on the left and/or right rear displays 136, 138, respectively. However, if the body control module 190 is no longer providing the input 192 to the video control unit 200, then the method 300 may proceed to step 314.

At step 314, once the input 192 is no longer being received at the video control unit 200, the video control unit 200 may stop providing the first exit assistance 202 and/or second exit assistance to the left and/or right rear displays 136, 138 after a first duration has passed. In the present example, the first duration is 10 seconds but may be between 5 seconds and 45 seconds or between 10 seconds and 60 seconds, for example.

After step 314, the method 300 may return to step 304 and continue to gather data or the method 300 may end at step 316.

Providing the left exit assistance 202 and/or the right exit assistance 204 on the left and/or right rear displays 136, 138, respectively, provides an occupant exiting the vehicle 100 with a view of external surroundings of the vehicle 100. Accordingly, the left exit assistance 202 and the right exit assistance 204 can help exiting occupants avoid hazards such as an animal, an approaching biker, or another vehicle by displaying—on the respective displays 136, 138—an area around the vehicle 100. The occupant can view the area around the vehicle 100 on one or more of the displays 136, 138 and time their exit from the vehicle 100 with a time when an actual or perceived hazard has past (i.e., when a biker or another vehicle has sufficiently passed the vehicle 100 to allow for safe exit from the vehicle 100).

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:
    obtaining a rear passenger status;
    obtaining a seat belt status;
    obtaining a door lock status;
    determining whether exit assistance conditions are met based on the rear passenger status, the seat belt status, and the door lock status; and
    displaying exit assistance on one or more displays of a vehicle; and
    wherein the exit assistance conditions comprise a first exit assistance condition that is met and the exit assistance is displayed on a left rear display of the one or more displays when a passenger is detected in a left rear seat of the vehicle, a left rear seat belt is unfastened, and a left rear passenger compartment door is unlocked.

2. The method of claim 1, wherein the exit assistance conditions comprise a second exit assistance condition that is met and the exit assistance is displayed on a right rear display of the one or more displays when a passenger is detected in a right rear seat of the vehicle, a right rear seat belt is unfastened, and a right rear passenger compartment door is unlocked.

3. The method of claim 2, wherein the exit assistance is displayed on the left rear display as long as the first exit assistance condition is met and is displayed on the right rear display as long as the second exit assistance condition is met.

4. The method of claim 2, wherein the exit assistance of the left rear display comprises a driver side view from the vehicle when the first exit assistance condition is met and the exit assistance of the right rear display comprises a co-pilot side view from the vehicle when the second exit assistance condition is met.

5. The method of claim 1, wherein the exit assistance is displayed on the one or more displays while the exit assistance conditions are met.

6. The method of claim 5, wherein the exit assistance is displayed for a first duration after the exit assistance conditions are no longer met.

7. The method of claim 1, wherein obtaining the rear passenger status further comprises at least one of monitoring weight sensors in one or more rear seats.

8. The method of claim 7, wherein obtaining the seat belt status further comprises monitoring seat belt sensors coupled to the one or more rear seats.

9. The method of claim 8, wherein obtaining the door lock status further comprises determining the door lock status at a body control module.

10. A system comprising:
    data processing hardware; and
    memory hardware in communication with the data processing hardware, the memory hardware storing instructions that, when executed on the data processing hardware, cause the data processing hardware to perform operations comprising:
    obtaining a rear passenger status;
    obtaining a seat belt status;
    obtaining a door lock status;
    determining whether exit assistance conditions are met based on the rear passenger status, the seat belt status, and the door lock status; and
    displaying an exit assistance on one or more displays of a vehicle; and
    wherein the exit assistance conditions comprise a first exit assistance condition that is met and the exit assistance is displayed on a left rear display of the one or more displays when a passenger is detected in a left rear seat of the vehicle, a left rear seat belt is unfastened, and a left rear passenger compartment door is unlocked.

11. The system of claim 10, wherein the exit assistance conditions comprise a second exit assistance condition that is met and the exit assistance is displayed on a right rear display of the one or more displays when a passenger is detected in a right rear seat of the vehicle, a right rear seat belt is unfastened, and a right rear passenger compartment door is unlocked.

12. The system of claim 11, wherein the exit assistance is displayed on the left rear display as long as the first exit assistance condition is met and is displayed on the right rear display as long as the second exit assistance condition is met.

13. The system of claim 11, wherein the exit assistance of the left rear display comprises a driver side view from the vehicle when the first exit assistance condition is met and the exit assistance of the right rear display comprises a co-pilot side view from the vehicle when the second exit assistance condition is met.

14. The system of claim 10, wherein the exit assistance is displayed on the one or more displays while the exit assistance conditions are met.

15. The system of claim 14, wherein the exit assistance is displayed for a first duration after the exit assistance conditions are no longer met.

16. A vehicle management system comprising:
a body control module;
a video control unit in communication with the body control module;
data processing hardware; and
memory hardware in communication with the data processing hardware, the memory hardware storing instructions that, when executed on the data processing hardware, cause the data processing hardware to perform operations comprising:
obtaining a rear passenger status using weight sensors in one or more rear seats;
obtaining a seat belt status using seat belt sensors in the one or more rear seats;
obtaining a door lock status at the body control module;
determining whether exit assistance conditions are met based on the rear passenger status, the seat belt status, and the door lock status; and
displaying an exit assistance on one or more rear displays of a vehicle; and
wherein the exit assistance conditions comprise a first exit assistance condition that is met and the exit assistance is displayed on a left rear display of the one or more rear displays when a passenger is detected in a left rear seat of the vehicle, a left rear seat belt is unfastened, and a left rear passenger compartment door is unlocked.

17. The vehicle management system of claim 16, wherein the exit assistance conditions comprise a second exit assistance condition that is met and the exit assistance is displayed on a right rear display of the one or more displays when a passenger is detected in a right rear seat of the vehicle, a right rear seat belt is unfastened, and a right rear passenger compartment door is unlocked.

18. The vehicle management system of claim 17, wherein the exit assistance is displayed on the left rear display as long as the first exit assistance condition is met and is displayed on the right rear display as long as the second exit assistance condition is met.

19. The vehicle management system of claim 17, wherein the exit assistance of the left rear display comprises a driver side view from the vehicle when the first exit assistance condition is met and the exit assistance of the right rear display comprises a co-pilot side view from the vehicle when the second exit assistance condition is met.

20. The vehicle management system of claim 16, wherein the exit assistance is displayed on a rear left display for a first duration after first exit conditions are no longer met and the exit assistance is displayed on a rear right display for the first duration after second exit conditions are no longer met.

* * * * *